(12) United States Patent
Su et al.

(10) Patent No.: US 9,927,690 B2
(45) Date of Patent: Mar. 27, 2018

(54) PROJECTION SCREEN

(71) Applicant: Coretronic Corporation, Hsin-Chu (TW)

(72) Inventors: Fang-Hsuan Su, Hsin-Chu (TW);
Hung-Ta Chien, Hsin-Chu (TW);
Fu-Chiang Hsu, Hsin-Chu (TW);
Fu-Ming Chuang, Hsin-Chu (TW);
Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/379,507

(22) Filed: Dec. 15, 2016

(65) Prior Publication Data

US 2017/0184953 A1     Jun. 29, 2017

(30) Foreign Application Priority Data

Dec. 24, 2015   (TW) .............................. 104143655 A

(51) Int. Cl.
| *G03B 21/602* | (2014.01) |
| *G02B 5/02* | (2006.01) |
| *G02B 17/00* | (2006.01) |

(52) U.S. Cl.
CPC ......... *G03B 21/602* (2013.01); *G02B 5/0231* (2013.01); *G02B 5/0242* (2013.01); *G02B 5/0278* (2013.01); *G02B 17/004* (2013.01)

(58) Field of Classification Search
CPC .................................................. G03B 21/602
USPC ........................ 359/443, 449, 459
See application file for complete search history.

(56) References Cited

U.S. PATENT DOCUMENTS

| 3,893,748 A | 7/1975 | De Palma et al. |
| 4,206,969 A | 6/1980 | Cobb et al. |
| 4,911,529 A | 3/1990 | Van De Ven |
| 5,096,278 A | 3/1992 | Yoshioka et al. |
| 6,023,369 A | 2/2000 | Goto |

(Continued)

FOREIGN PATENT DOCUMENTS

| CN | 101297241 | 10/2008 |
| CN | 101526730 | 9/2009 |

(Continued)

*Primary Examiner* — Christopher Mahoney
(74) *Attorney, Agent, or Firm* — JCIPRNET

(57) ABSTRACT

A projection screen, adapted to receive an image beam, includes a transparent substrate, optical pillar structures, a light-scattering layer, Fresnel structures and a light-absorption layer. The transparent substrate has first surface and second surface opposing to each other. The optical pillar structures are located at the first surface, and between the light-scattering layer and the transparent substrate. Each optical pillar structure is arranged along the first direction. The Fresnel structures are located at the second surface, and disposed between the transparent substrate and the light-absorption layer. Each Fresnel structure has a reflective surface and a transmissive surface connected to the reflective surface. The image beam sequentially passes through the light-scattering layer, the optical pillar structures, the transparent substrate and travels to the reflective surfaces, and the image beam is reflected by the reflective surfaces and outputs from the projection screen. The half-gain angle in the first direction falls within 40°-85°.

18 Claims, 4 Drawing Sheets

(56) References Cited

U.S. PATENT DOCUMENTS

| | | |
|---|---|---|
| 6,600,600 B2 | 7/2003 | Chen |
| 6,842,282 B2 | 1/2005 | Kuroda et al. |
| 7,110,176 B2 | 9/2006 | Maruta et al. |
| 7,262,911 B2 | 8/2007 | Niwa et al. |
| 7,859,750 B2 | 12/2010 | Akiyama |
| 8,115,996 B2 | 2/2012 | Kitabayashi |
| 8,218,236 B2 | 7/2012 | Shiau et al. |
| 8,711,475 B2 | 4/2014 | Jeon et al. |
| 8,780,444 B2 | 7/2014 | Arakawa et al. |
| 9,030,736 B2 * | 5/2015 | Sadahiro ................ G03B 21/60 359/449 |
| 9,395,616 B2 | 7/2016 | Chuang et al. |
| 2005/0057804 A1 | 3/2005 | Umeya et al. |
| 2006/0109548 A1 * | 5/2006 | Goto ...................... G03B 21/10 359/449 |
| 2011/0261327 A1 * | 10/2011 | Endo ...................... G02B 5/0231 353/38 |
| 2014/0036359 A1 | 2/2014 | Jeon et al. |
| 2014/0092471 A1 | 4/2014 | Sadahiro et al. |
| 2015/0286125 A1 * | 10/2015 | Powell .................. G03B 21/60 359/443 |

FOREIGN PATENT DOCUMENTS

| | | |
|---|---|---|
| CN | 102023471 | 4/2011 |
| CN | 101697058 | 8/2011 |
| CN | 102243430 | 11/2011 |
| CN | 101903809 | 2/2012 |
| EP | 0311189 | 4/1989 |
| EP | 2696243 | 2/2014 |
| JP | H03156435 | 7/1991 |
| JP | 3341225 | 11/2002 |
| JP | 2005351952 | 12/2005 |
| JP | 2009169037 | 7/2009 |
| JP | 2009192875 | 8/2009 |
| JP | 2009210853 | 9/2009 |
| JP | 2013068721 | 4/2013 |
| JP | 2013073077 | 4/2013 |
| JP | 2013088543 | 5/2013 |
| TW | 200304579 | 10/2003 |
| TW | I378314 | 12/2012 |
| TW | I494681 | 8/2015 |
| TW | 201537237 | 10/2015 |

* cited by examiner

PROJECTION SCREEN

CROSS-REFERENCE TO RELATED APPLICATION

This application claims the priority benefit of Taiwan application serial no. 104143655, filed on Dec. 24, 2015. The entirety of the above-mentioned patent application is hereby incorporated by reference herein and made a part of this specification.

BACKGROUND OF THE INVENTION

Field of the Invention

The invention generally relates to projection screen, in particular, to a projection screen suitable for use in ultra-short focus projection system.

Description of Related Art

As to the ultra-short focus projection system, it needs to project a large size image in a very short projection distance, and therefore the range of the incident angle for the image beam used in projection is relatively greater than that in the common situation. If the common projection screen is used, it would cause the issue that the luminance gain is insufficient or the luminance distribution on the screen is not uniform. As an example in case, the projection screen used in long focus projector is taken as the projection screen used in ultra-short focus projector. Only a relatively small range of the incident angle of the image beam is considered in design for the projection screen used in the long focus projector. If the projection screen used in long focus projector is taken as the projection screen n ultra-short focus projection system, the reflected image beam would deviate from the viewing direction of viewer when the image beam is incident on the projection screen at a relatively large incident angle. As a result, it causes the issues that the luminance gain is insufficient and the luminance distribution on the screen is not uniform.

On the other hand, in case, the projection screen with large viewing angle is applied to the ultra-short focus projection system. Since the projection screen with large viewing angle has a light-scattering layer, the image beam in any incident angle can be uniformly reflected and it can solve the issue that the luminance distribution is not uniform. However, the drawback of this manner is that the luminance gain is not high. Further, if the projection screen with high luminance gain is applied to the ultra-short projection system, the viewer would see the projection image with uneven luminance when viewing in different viewing angles.

Further, if the projection screen with high contrast is applied to the ultra-short projection system, the projection screen with high contrast has light absorbing material and the absorbing material with respect to the light only has the selection n incident direction. In other words, when the propagation direction of the image beam is close to the propagation direction of the ambient light, the light absorbing material would absorb both the image beam and the ambient light. This manner would also reduce the luminance gain. In other words, this manner scarifies the luminance gain to reach high contrast level without the advantage having both high luminance gain and high contrast.

In addition, if the projection screen with capability of anti-ambient light is applied to the ultra-short projection system, the reflectivity of the projection screen with capability of anti-ambient light has selectivity to the incident angle of light, and the image beam within a specific range of the incident angle can be reflected back to the viewer and the ambient light at the other incident direction would be absorbed or deviated from the viewing direction. However, if the projection screen with capability of anti-ambient light is applied to the ultra-short projection system, it is difficult in design to reach the advantages having high gain, wide viewing angle, and high contrast.

As to the foregoing descriptions, how to solve the foresaid issues is essentially concerned by the one for development.

The section of "description of related art" is just used to help the understanding of the invention, the disclosure in the section of "description of related art" may comprise some prior art not known by the one with ordinary skill in the art. The disclosure in the section of "description of related art" does not represent all the issues to be solved by this section or by one or more embodiments in the invention and already known or recognized by the one with ordinary skill in the art before the application of the invention.

SUMMARY OF THE INVENTION

The invention provides a projection screen, which at the same time has wider horizontal viewing angle, higher gain, higher contrast and better capability of anti-ambient light.

The other objectives and advantages of the invention can be further understood from the disclosure of technical features in the invention.

To reach one or a part or all of the objectives, or other objective, the invention provides a projection screen, adapted to receive an image beam. The projection screen comprises a transparent substrate, a plurality of optical pillar structures, a light-scattering layer, a plurality of Fresnel structures and a light-absorption layer. The transparent substrate has a first surface and a second surface opposing to the first surface. The optical pillar structures are located at the first surface of the transparent substrate and arranged along a first direction. Each of the optical pillar structures extends along a second direction. The light-scattering layer is disposed at one side of the optical pillar structures and the optical pillar structures are disposed between the light-scattering layer and the transparent substrate. The Fresnel structures are located at the second surface of the transparent substrate, wherein each of the Fresnel structures comprises a reflection surface and a transmissive surface and the reflection surface connects to the transmissive surface. The Fresnel structures are disposed between the transparent substrate and the light-absorption layer, wherein the image beam sequentially passes through the light-scattering layer, the optical pillar structures and the transparent substrate and travels to the reflection surfaces of the Fresnel structures, and is reflected by the reflection surfaces and then outputs from the projection screen. A half-gain angle of the projection screen at the first direction is in a range from 40 degrees to 85 degrees.

As to the foregoing descriptions, the embodiments of the invention can have at least one of advantages or effects as follows. In the projection screen of embodiments of the invention, the image beam sequentially passes through the light-scattering layer, the optical pillar structures, and the transparent substrate and then travels to the reflective surfaces of the Fresnel structures. The image beam having been reflected by the reflective surfaces again sequentially passes through the transparent substrate, the optical pillar structures, the light-scattering layer and then outputs from the projections screen. The half-gain angle of the projection screen at the first direction (horizontal direction) is in a range from 40 degrees to 85 degrees. The optical pillar structures are used to increase the scattering angle at the first direction of the image beam incident on the projection screen and to guide the image beam to the viewing direction. Therefore, the projection screen in the embodiments of the invention has wider scattering view angle at the first direction, suitable for use in ultra-short focus projection system in large size. The implementation of the reflection surfaces of the Fresnel structures can guide a portion of the image beam, which is originally reflected at the second direction (vertical direction) with large reflection angle, into the forward direction of the projection screen (viewing direction), so the luminance gain of the image beam can be further improved. In addition, a portion of the ambient light travels to the transmissive surfaces of the Fresnel structures, and the portion of the ambient light is absorbed by the light-absorption layer after passing through the transmissive surfaces, so the contrast and the capability of anti-ambient light for the projection screen can be improved. As a result, a projection screen in the embodiments of the invention at the same time can have wider horizontal viewing angle, higher gain, higher contrast and better capability of anti-ambient light.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting.

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1A:
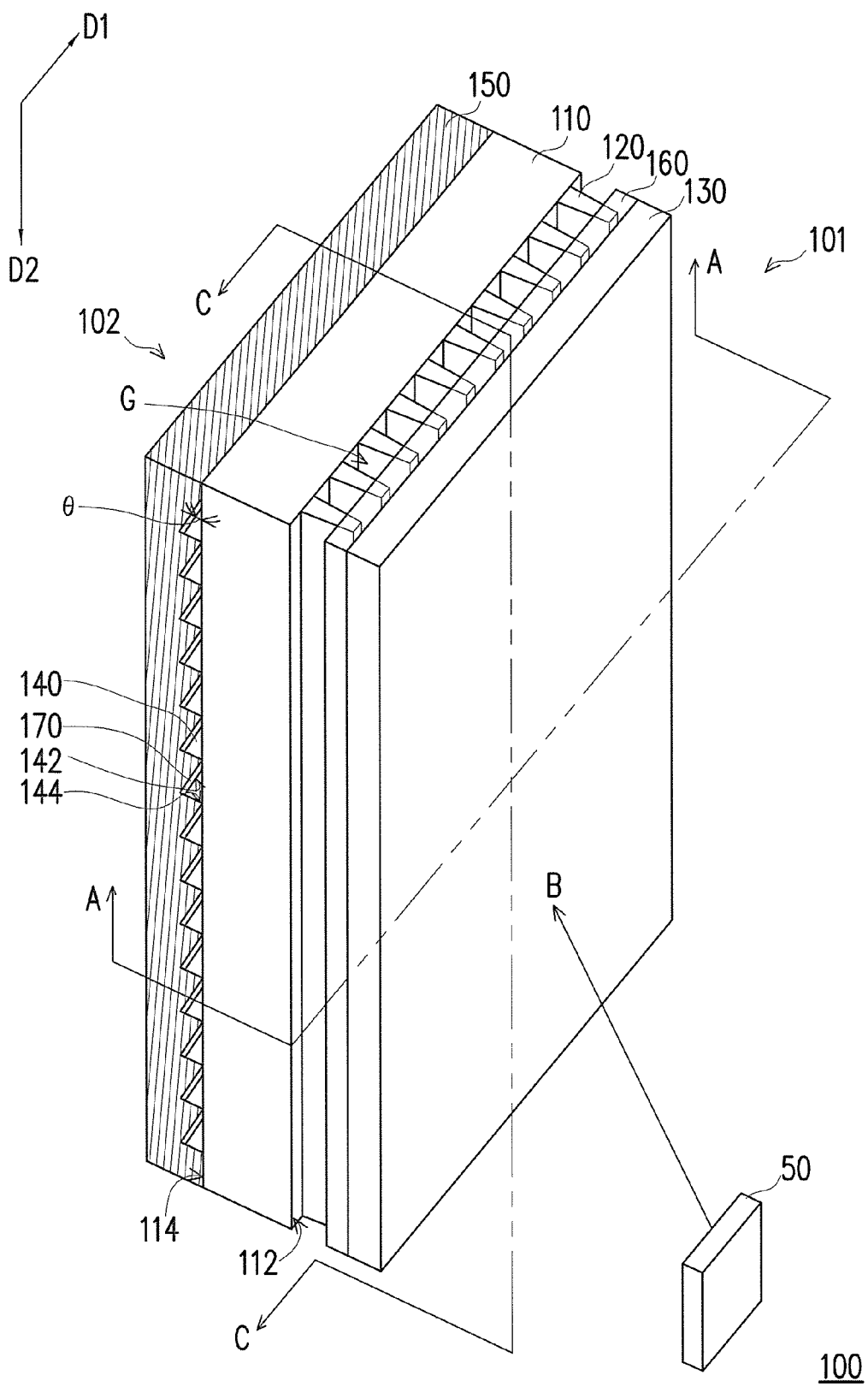
FIG. 1A is a drawing, schematically illustrating a perspective view of a projection screen, according to an embodiment of the invention.
Figure 1B:
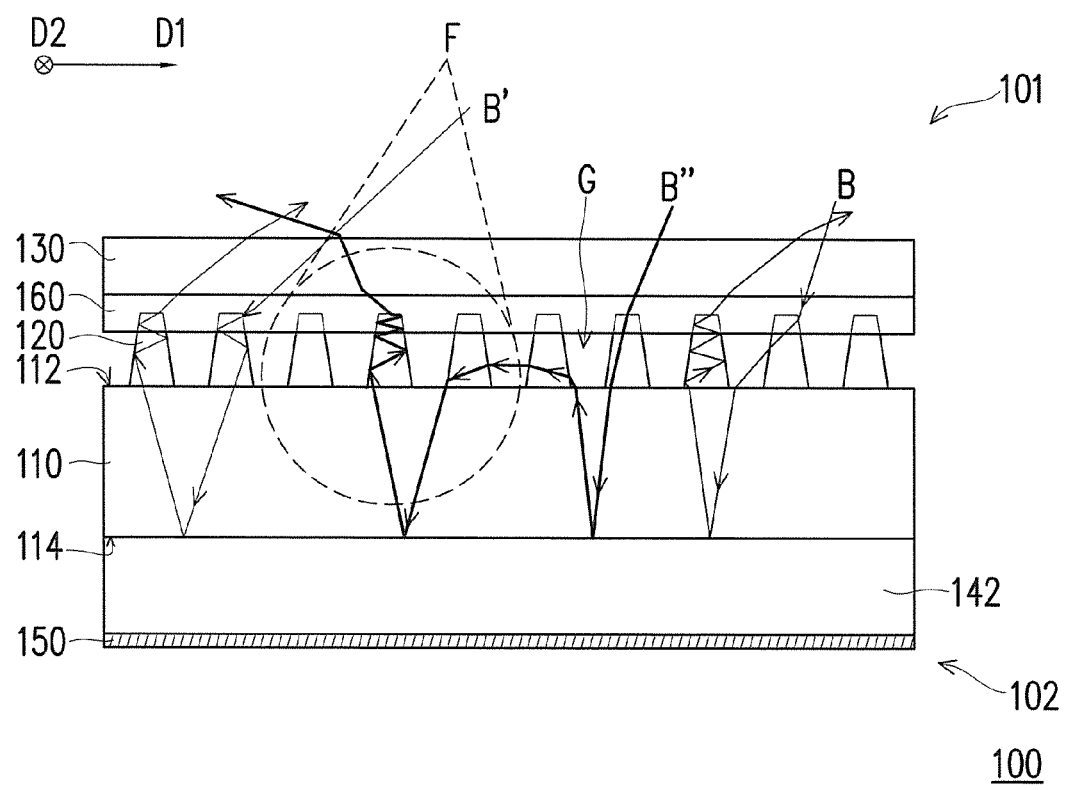
FIG. 1B is a drawing, schematically illustrating a cross-sectional structure of the projection screen cutting at the line A-A in FIG. 1A, according to an embodiment of the invention.
Figure 1C:
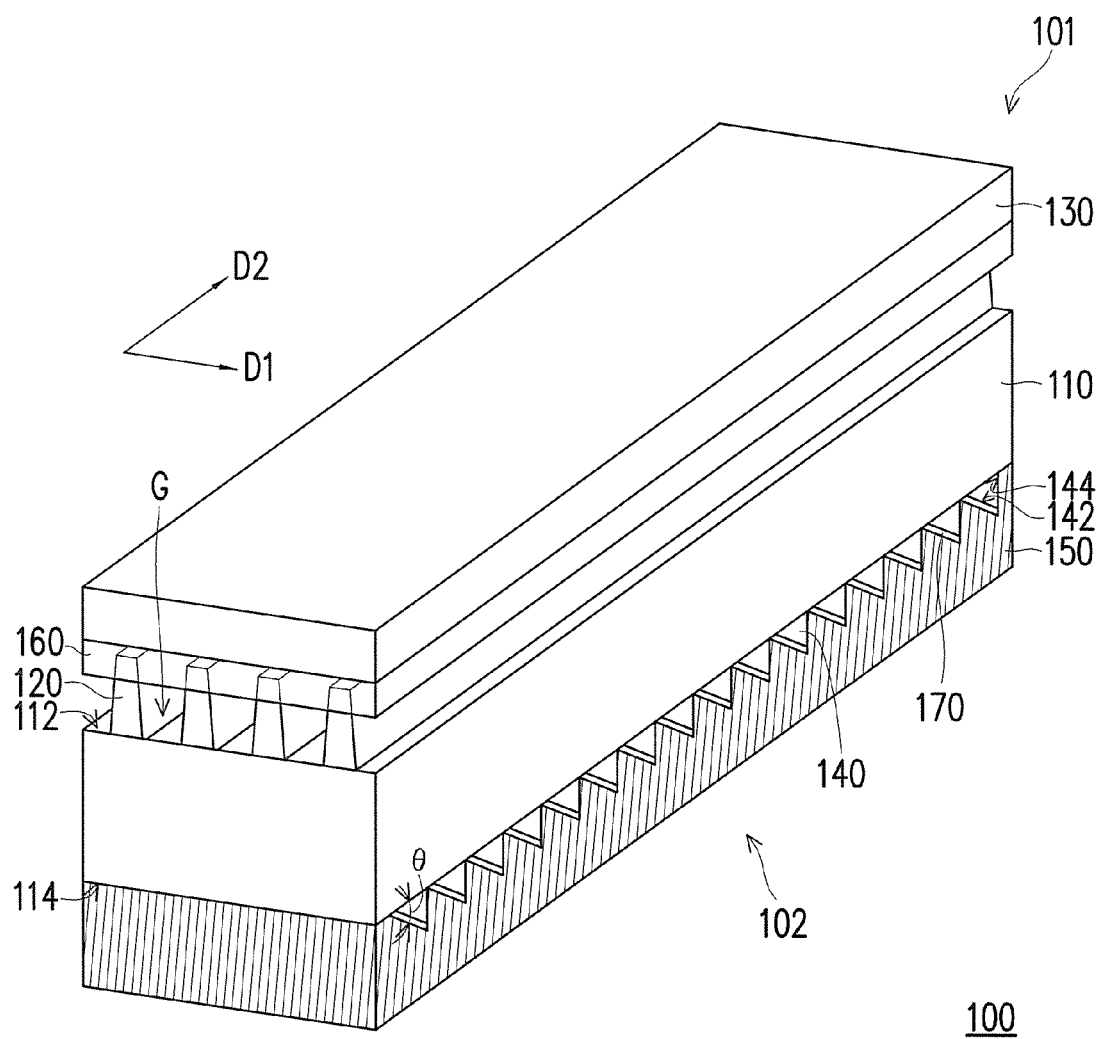
FIG. 1C is a drawing, schematically illustrating a cross-sectional structure of the projection screen cutting at the line C-C in FIG. 1A, according to an embodiment of the invention.

FIG. 1A is a drawing, schematically illustrating a perspective view of a projection screen, according to an embodiment of the invention. FIG. 1B is a drawing, schematically illustrating a cross-sectional structure of the projection screen cutting at the line A-A in FIG. 1A, according to an embodiment of the invention. FIG. 1C is a drawing, schematically illustrating a cross-sectional structure of the projection screen cutting at the line C-C in FIG. 1A, according to an embodiment of the invention. Referring to FIG. 1A, FIG. 1B and FIG. 1C, a projection screen 100 in an embodiment adapts to receive an image beam B. The projection screen 100 includes a transparent substrate 110, a plurality of optical pillar structures 120, a light-scattering layer 130, a plurality of Fresnel structures 140 and a light-absorption layer 150. The transparent substrate 110 has a first surface 112 and a second surface 114, opposing to each other, in which its material can be polyethylene terephthalate (PET) as an example. The optical pillar structures 120 are located on the first surface 112 of the transparent substrate 110 and the Fresnel structures 140 are located on the second surface 114 of the transparent substrate 110.

The optical pillar structures 120 are arranged along a first direction D1, such as a horizontal direction, and each of the optical pillar structures 120 extends along a second direction D2, such as a vertical direction. The material of the optical pillar structures 120 in an example can be UV (ultraviolet) curing glue or other transparent material.

The light-scattering layer 130 is located at one side of the optical pillar structures 120 and the optical pillar structures 120 are disposed between the light-scattering layer 130 and the transparent substrate 110. The light-scattering layer 130 scatters the image beam B outputting from the projection screen 100, so to avoid reflection of the image beam B along the same direction and causing light spots on the projection screen 100. Further in an embodiment, the surface of the light-scattering layer 130 can be coated with surface hard coating (not shown). Thereby, the light-scattering layer 130 also has the function of protection, to protect the inner elements of the projection screen 100.

The Fresnel structures 140 are arranged along the second direction D2, and each of the Fresnel structures 140 extends along the first direction D1. Each of the Fresnel structures 140 includes a reflection surface 142 and a transmissive surface 144. Each reflection surface 142 connects to the corresponding transmissive surface 144. In an embodiment, the first direction D1 is the horizontal direction as an example. The second direction D2 is the vertical direction as an example. The first direction D1 is substantially perpendicular to the second direction D2. In addition, each reflection surface 142 and each transmissive surface 144 are the surfaces extending along the first direction D1.

The light-absorption layer 150 is disposed on the Fresnel structures 140. In other words, the Fresnel structures 140 are disposed between the transparent substrate 110 and the light-absorption layer 150. In detail, the light-absorption layer 150 covers (with direct contact) the transmissive surface 144 of each of the Fresnel structures 140. In addition, a material of the light-absorption layer 150 in an example can be black coating, a glue doped with black material, or other material having high rate for absorbing light.

In an embodiment, the projection screen 100 includes an image-source side 101 and a rear side 102 opposing to the image-source side 101. An external image source 50, such as a common projector, short focus projector or ultra-short projector, is disposed at the image-source side 101 of the projection screen 100, and emits the image beam B toward the projection screen 100. To a direction from the image-source side 101 to the rear side 102 of the projection screen 100, the arrangement manner of the foresaid inner elements of the projection screen 100 in sequence are the light-scattering layer 130, the optical pillar structures 120, the transparent substrate 110, the Fresnel structures 140 and the light-absorption layer 150. In an embodiment, a thickness of the transparent substrate 110 at the direction from the image-source side 101 to the rear side 102 is about 100 microns to 200 microns. The thickness of each of the optical pillar structures 120 at the direction from the image-source side 101 to the rear side 102 is about 40 microns. However in other embodiments, the thickness of the transparent substrate 110 and the thickness of each of the optical pillar structures 120 can be changed according to the actual need in design and the invention is not just limited to these. Referring to FIG. 1B, the image beam B sequentially passes the light-scattering layer 130, the optical pillar structures 120 and the transparent substrate 110, and travels to the reflection surfaces 142 of the Fresnel structures 140. The image beam B reflected by the reflection surfaces 142 again sequentially passes transparent substrate 110, the optical pillar structures 120, the light-scattering layer 130 and then outputs from the projection screen 100. The gain (luminance) is diminishing outwards from the center of the projection screen 100. An angle at which a half gain can be observed is defined as a half-gain angle. In an embodiment, the half-gain angle of the projection screen 100 at the first direction D1 (horizontal direction) is in a range from 40 degrees to 85 degrees. In addition, the half-gain angle of the projection screen 100 at the second direction D2 (vertical direction) is in a range from 40 degrees to 70 degrees.

In an embodiment, the optical pillar structures 120 are used to increase the half-gain angle of the projection screen 100 at the first direction D1 and guide the image beam B toward the viewer (not shown) at the image-source side 101. The half-gain angle of the projection screen 100 at the first direction D1 (horizontal direction) is in a range from 40 degrees to 85 degrees. Thereby, the projection screen 100 in an embodiment has wider viewing angle and can be used in an ultra-short projection system, particularly to the ultra-short projection system with large size.

Referring to FIG. 1A and FIG. 1B again, as a result, when the image beam B from the image source 50 is incident to the projection screen 100, the image beam B sequentially passes the light-scattering layer 130, the optical pillar structures 120 and the transparent substrate 110, and travels to the reflection surfaces 142 of the Fresnel structures 140. After the image beam B is reflected by the reflection surfaces 142, the image beam B is outputted from the projection screen 100 to travels to the eyes of viewer. As understood, the implementation of the reflection surfaces 142 of the Fresnel structures 140 can guide a portion of the image beam B, which is originally reflected at the second direction (vertical direction) with large reflection angle, into the forward direction (viewing direction) of the projection screen 100. It can avoid the image beam B to be projected toward the location having no viewer. In other words, the Fresnel structures 140 can adjust the vertical viewing angle of the projection screen 100 at the second direction D2 (vertical direction). The image beam B after outputting from the projection screen 100 has smaller scattering angle at the second direction D2. In an embodiment, the vertical viewing angle at the second direction D2 (vertical direction) is relatively smaller than the horizontal viewing angle at the first direction D1. As a result, it can further improve the utilization efficiency of the image beam B, and the luminance gain of the image beam B projected on the projection screen 100 can be effectively improved due to the implementation of the reflection surfaces 142 of the Fresnel structures 140.

Further in an embodiment, the image source 50 as an example is disposed at the lower side relative to the projection screen 100, and the reflection surface 142 and the transmissive surface 144 of each Fresnel structure 140 respectively face toward the opposing two sides of the projection screen 100, such as the lower side and the upper side relative to the projection screen 100. The image beam B is projected from the relative lower side of the projection screen 100 toward the relative upper side. The image beam B is incident to the projection screen 100 according to the foresaid light path and reflected to the eyes of viewer, in which the viewer and the image source 50 are located at the same side. On the other hand, when the ambient light is incident to the projection screen 100, and both the ambient light and the image beam B are incident to the projection screen 100 by different incident angles, a portion of the ambient light would travel to the transmissive surfaces 144 of the Fresnel structures 140 and the light-absorption layer 150 disposed behind the transmissive surfaces 144 would absorb this portion of ambient light. The ambient light as foresaid (not shown) in an example is emitted from the lamp at the relative upper side of the projection screen 100 or emitted from the other light source and reflected downward from the ceiling at the relative upper side of the projection screen 100. The ambient light in an example is incident to the projection screen 100 from the relative upper side of the projection screen 100. The image beam B in an example is incident to the projection screen 100 from the relative lower side of the projection screen 100. That is, the ambient light does not output from the projection screen 100 and then affect the image quality. Thereby, the projection careen 100 of an embodiment has the function of anti-ambient light and then can improve the contrast and the capability of anti-ambient light for the projection screen 100.

Figure 1D:
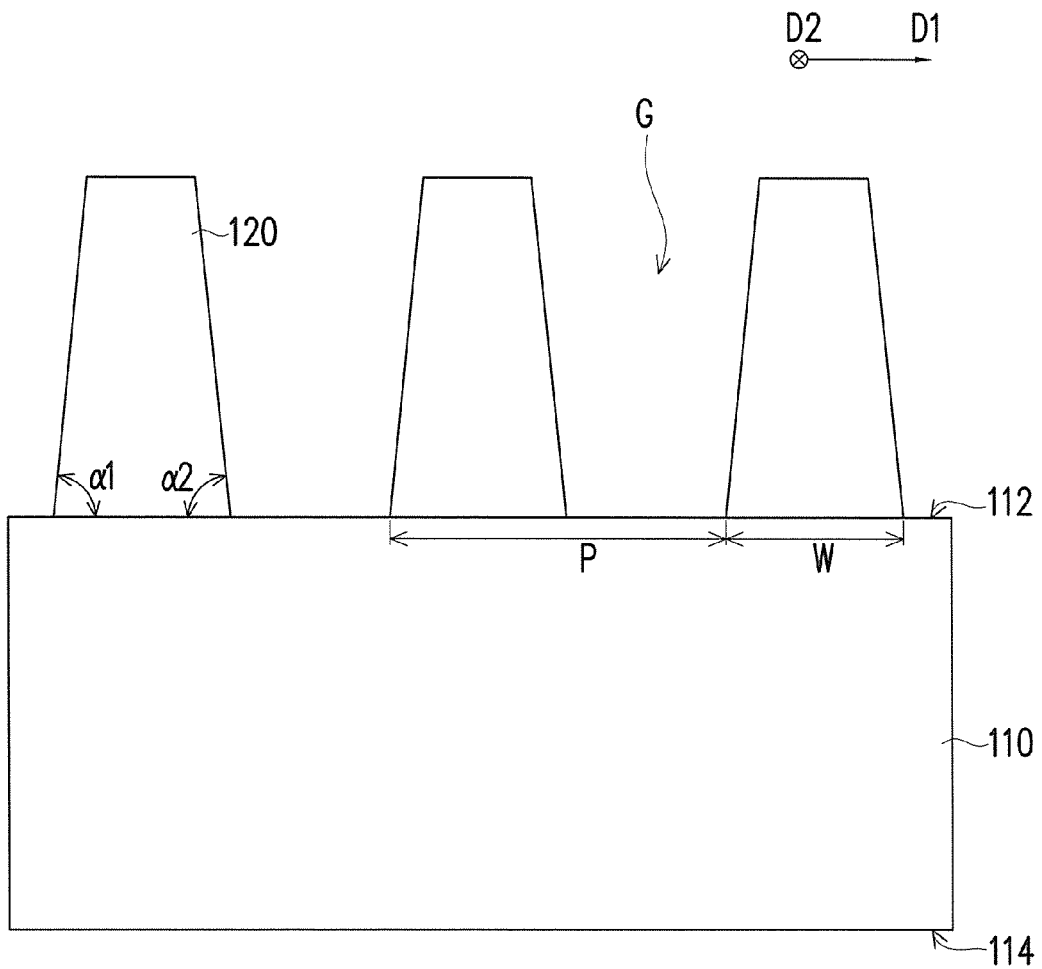
FIG. 1D is a drawing, schematically illustrating an expansion structure at the region F in FIG. 1B, according to an embodiment of the invention.

Referring to FIG. 1B and FIG. 1D, FIG. 1D is a drawing, schematically illustrating an expansion structure at the region F in FIG. 1B, according to an embodiment of the invention. Remarkably, for descriptions in clarity, FIG. 1D only illustrates the optical pillar structures 120 and the transparent substrate 110, and the other elements are omitted. In an embodiment, each of the optical pillar structures 120 as an example is a trapezoidal pillar structure 120 which has a trapezoidal cross section in the first direction D1. The width of each trapezoidal pillar structure 120 at the first direction D1 is incremental along a direction from the light-scattering layer 130 to the transparent substrate 110. In other words, the width of each trapezoidal pillar structure 120 at the first direction D1 is incremental along a direction from the image-source side 101 to the rear side 102 and the width of each of optical pillar structures 120 at the second direction D2 is not changed. In an embodiment, each of the trapezoidal pillar structures 120 as an example is an isosceles trapezoidal pillar structure 120. Further in an embodiment, a bottom angle $\alpha 1$ of each isosceles trapezoidal pillar structure 120 and another bottom angle $\alpha 2$ of each isosceles trapezoidal pillar structure 120 are in a range from 60 degrees to 80 degrees. If the bottom angles $\alpha 1$ and $\alpha 2$ of each trapezoidal pillar structure 120 are out of the foresaid angle range, the directional property of the light beam at the horizontal direction cannot be effectively reduced. Further in an embodiment, an arrangement period P of the trapezoidal pillar structures 120 along the first direction D1 is in a range from 30 microns to 100 microns. If the arrangement period P is greater than 100 microns, it would easily cause poor quality or moiré for the formed image as projected by the projection screen 100. If the arrangement period P is less than 30 microns, it would cause higher difficulty in fabrication. Further in an embodiment, a ratio of the width W of each trapezoidal pillar structure 120 on the first surface 112 of the transparent substrate 110 to the arrangement period P at the first direction D1 is in a range from 0.3 to 0.8. If the ratio is in the range from 0.3 to 0.8, it can effectively improve the function to reduce the directional property of the projection screen 100. Anyone of the optical pillar structures 120 satisfying the foregoing ratio condition can have better optical quality and have larger half-gain angle of the projection screen 100 at the first direction D1 (horizontal direction).

Remarkably, in other embodiments not shown, the shape of the optical pillar structures 120 can also be a rectangular pillar structure, triangular pillar structure, or other pillar structure in different shape but the invention is not limited to these.

Referring to FIG. 1C, in an embodiment, the reflection surface 142 in each of the Fresnel structures 140 and the second surface 114 of the transparent substrate 110 form an included angle θ, in which the included angles θ corresponding to the reflection surfaces 142 are the same. In other embodiments not shown, the included angles θ corresponding to the reflection surfaces 142 of the Fresnel structures 140 are gradually change along the second direction D2. Further in detail, the included angles θ in an example are incremental along the second direction D2 from the relative lower side of the projection screen 100 to the relative upper side of the projection screen 100. Thereby, the luminance gain of the image beam B on the projection screen 100 can be effectively improved.

Referring to FIG. 1A to FIG. 1C, the projection screen 100 in an embodiment can further include a plurality of reflection layers 170, wherein each of the reflection layers 170 is correspondingly disposed on each of the reflection surfaces 142 along the extending direction of the reflection surfaces 142 of the Fresnel structures 140. The material of the reflection layers 170 in an example can be a material with high reflectivity, such as a material with the reflection rate equal to or greater than 70%. The material of the reflection layers 170 in an example is Al, Ag or the combination thereof.

Still referring to FIG. 1A to FIG. 1C, in an embodiment, a gap G is formed between the adjacent optical pillar structures 120. The dielectric material in the gap G can be air as an example. The image beam B, B', B" after entering the projection screen 100 and passing the light-scattering layer 130 performs multiple times of reflection and refraction inside the optical pillar structures 120 and the gap G of the adjacent optical pillar structures 120. The image beam B, B', B" continuously travels to the transparent substrate 110 and the reflection surfaces 142 of the Fresnel structures 140. The image beam B, B', B" after being reflected by the reflection surfaces 142 and passing the transparent substrate 110 performs multiple times of reflection and refraction inside the optical pillar structures 120 and the gap G of the adjacent optical pillar structures 120. The image beam B, B', B" continuously passes the light-scattering layer 130 and outputs from the projection screen 100. In other embodiments not shown, an optical material layer (not shown) can be disposed in the gap G between the adjacent optical pillar structures 120. The optical material layer can be transparent material with a refractive index less than or equal to a refractive index of the optical pillar structures 120 and the optical material layer includes a plurality of scattering particles (not shown). The foregoing implementation can further cause the image beam B, B', B" which is incident to the projection screen 100 to be scattered in optical material layer disposed in the gap G between the adjacent optical pillar structures 120.

Referring to FIG. 1B again, the image beam have various possible light paths. Three possible light paths are illustrated are provided. However, the light path of the image beam is not just limited to the three light paths as provided. In an embodiment with detail, for a light path of the image beam, after the image beam B is incident to the projection screen 100 and has multiple times of refraction inside the optical pillar structures 120, the image beam B reflected by the reflection surfaces 142 of the Fresnel structures 140 again travels to the optical pillar structures 120. After the image beam B performs multiple times of reflection and refraction in the optical pillar structures 120, the image beam B leaves the optical pillar structures 120 by a larger angle. Continuously, the image beam B passes the light-scattering layer 130 and outputs from the projection screen 100. Further, for another light path of the image beam B', the image beam B' passes the light-scattering layer 130, performs multiple times of reflection and refraction inside the optical pillar structures 120, passes the transparent substrate 110, and travels to the reflection surfaces 142. Subsequently, the image beam B' reflected by the reflection surfaces 142 is again incident to the optical pillar structures 120 to again perform multiple times of reflection and refraction inside the optical pillar structures 120, and then passes the light-scattering layer 130 and outputs from the projection screen 100. Further, for another light path of the image beam B", the image beam B" passes through the light-scattering layer 130, the optical pillar structures 120 and the transparent substrate 110 and travels to the reflection surfaces 142. The image beam B" is again reflected to another one of the optical pillar structures 120 by the reflection surfaces 142 and again travels to another one of the optical pillar structures 120, and again passes the transparent substrate 110, and again travels to the reflection surfaces 142. After the image beam B" is again reflected to another one of the optical pillar structures 120 by the reflection surfaces 142 to perform multiple times of reflection and refraction inside the another one of the optical pillar structures 120, the image beam B" passes the light-scattering layer 130 and outputs from the projection screen 100. Further in detail, the optical pillar structures 120 can reduce the directional property of the image beam B, B' and B". Also and, the main output direction from the projection screen 100 is the horizontal direction, so to increase scattering angle of the projection screen 100 at the horizontal direction and expand the half-gain angle at the horizontal direction.

Referring to FIG. 1A to FIG. 1C, the projection screen 100 in an embodiment further includes an optical clear adhesive layer 160 (OCA layer), wherein the optical clear adhesive layer 160 is disposed between the light-scattering layer 130 and the transparent substrate 110 and the light-scattering layer 130 is adhered to the optical pillar structures 120 by the optical clear adhesive layer 160. Remarkably, the optical clear adhesive layer 160 can be optionally disposed in the projection screen 100.

As further described in other embodiments, the projection screen 100 can further include a plurality of diffusion micro-structures (not shown). The diffusion micro-structures can be disposed at the first surface 112 of the transparent substrate 110, the second surface 114 of the transparent substrate 110, surfaces of the optical pillar structures 120, the reflection surfaces 142 of the Fresnel structures 140, inside of the optical clear adhesive layer 160 and/or a surface of the optical clear adhesive layer 160. The above implementation can further scatter the image beam B, B', B" incident to the projection screen 100 at the foresaid locations.

Further in other embodiment not shown, each of the optical pillar structures 120 further includes a plurality of diffusion micro-structures (not shown), and the diffusion micro-structures are evenly disposed inside of each of the optical pillar structures 120. The above implementation can further scatter the image beam B, B', B" incident to the projection screen 100 at the foresaid locations.

As to the foregoing descriptions, the embodiment of the invention can have at least one of advantages or effects as follows. In the projection screen of embodiments of the invention, the image beam sequentially passes through the light-scattering layer, the optical pillar structures, and the transparent substrate and then travels to the reflective surfaces of the Fresnel structures. The image beam having been reflected by the reflective surfaces again sequentially passes through the transparent substrate, the optical pillar structures, the light-scattering layer and then outputs from the projections screen. The half-gain angle of the projection screen at the first direction (horizontal direction) is in a range from 40 degrees to 85 degrees. The optical pillar structures are used to increase the scattering angle at the first direction of the image beam outputting from the projection screen and to guide the image beam to the viewing direction. Therefore, the projection screen in the embodiments of the invention has wider scattering view angle at the horizontal direction, suitable for use in ultra-short focus projection system in large size. The implementation of the reflection surfaces of the Fresnel structures can guide a portion of the image beam, which is originally reflected at the second direction (vertical direction) with large reflection angle, into the forward direction of the projection screen (viewing direction), so the luminance gain of the image beam can be further improved. In addition, a portion of the ambient light travels to the transmissive surfaces of the Fresnel structures, and the portion of the ambient light is absorbed by the light-absorption layer behind the Fresnel structures, so the contrast and the capability of anti-ambient light for the projection screen can be improved. Thereby, a projection screen in the embodiments of the invention at the same time can have wider horizontal viewing angle, higher gain, higher contrast and better capability of anti-ambient light.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims. Further, the terms of first surface, second surface and so on as stated in specification are just used to represent the element name but not for limiting the maximum or the minimum for the number of assembled elements.

What is claimed is:

1. A projection screen, adapted to receive an image beam, the projection screen comprising:
    a transparent substrate, having a first surface and a second surface opposing to each other;
    a plurality of optical pillar structures, located at the first surface of the transparent substrate and arranged along a first direction, each of the optical pillar structures extending along a second direction;
    a light-scattering layer, located at one side of the optical pillar structures and the optical pillar structures being disposed between the light-scattering layer and the transparent substrate;
    a plurality of Fresnel structures, located at the second surface of the transparent substrate, wherein each of the Fresnel structures comprises a reflection surface and a transmissive surface and the reflection surface connects to the transmissive surface; and
    a light-absorption layer, the Fresnel structures disposed between the transparent substrate and the light-absorption layer, wherein the image beam sequentially passes through the light-scattering layer, the optical pillar structures and the transparent substrate and travels to the reflection surfaces of the Fresnel structures, and is reflected by the reflection surfaces and then outputs from the projection screen, a half-gain angle of the projection screen at the first direction is in a range from 40 degrees to 85 degrees.

2. The projection screen as recited in claim 1, wherein the image beam is reflected to the optical pillar structures by the reflection surfaces of the Fresnel structures, and the image beam passes the light-scattering layer and outputs from the projection screen after the image beam performs a plurality of times of reflection in the optical pillar structures.

3. The projection screen as recited in claim 1, wherein each of the optical pillar structures is a trapezoidal pillar structure and widths of the trapezoidal pillar structures at the first direction are incremental along a direction from the light-scattering layer to the transparent substrate.

4. The projection screen as recited in claim 3, wherein each of the trapezoidal pillar structures is an isosceles trapezoidal pillar structure.

5. The projection screen as recited in claim 3, wherein a first bottom angle of each of the trapezoidal pillar structures and a second bottom angle of each of the trapezoidal pillar structures are in a range from 60 degrees to 80 degrees.

6. The projection screen as recited in claim 3, wherein an arrangement period of the trapezoidal pillar structures along the first direction is in a range from 30 microns to 100 microns.

7. The projection screen as recited in claim 3, wherein a ratio of the widths of the trapezoidal pillar structures on the first surface of the transparent substrate to an arrangement period of the trapezoidal pillar structures along the first direction is in a range from 0.3 to 0.8.

8. The projection screen as recited in claim 1, wherein the adjacent optical pillar structures have a gap.

9. The projection screen as recited in claim 8, further comprising an optical material layer disposed in the gap, wherein a refractive index of the optical material layer is lower than a refractive index of each of the optical pillar structures and the optical material layer comprises a plurality of scattering particles.

10. The projection screen as recited in claim 8, wherein after the image beam transmitting through the light-scattering layer, the image beam performs a plurality of times of reflection and refraction inside the optical pillar structures and the gap between the adjacent optical pillar structures, and after the image beam continuously travels to the transparent substrate and the reflection surfaces of the Fresnel structures and then is reflected by the reflection surfaces and transmits through the transparent substrate, the image beam performs a plurality of times of reflection and refraction inside the optical pillar structures and the gap between the adjacent optical pillar structures, the image beam then continuously passes the light-scattering layer and outputs from the projection screen.

11. The projection screen as recited in claim 1, wherein the Fresnel structures are arranged along the second direction and each of the Fresnel structures extends along the first direction, the first direction is substantially perpendicular to the second direction.

12. The projection screen as recited in claim 11, wherein the reflection surface of each of the Fresnel structures and the second surface of the transparent substrate form an included angle, and the included angles corresponding to the reflection surfaces gradually change along the second direction.

13. The projection screen as recited in claim 1, wherein the reflection surface of each of the Fresnel structures and the second surface of the transparent substrate form an included angle, and the included angles corresponding to the reflection surfaces are substantially equal.

14. The projection screen as recited in claim 1, further comprising a plurality of reflection layers, wherein the reflection layers are respectively disposed on the reflection surfaces of the Fresnel structures and a reflectivity of the reflections layers is equal to or greater than 70%.

15. The projection screen as recited in claim 1, further comprising an optical clear adhesive layer, wherein the light-scattering layer is adhered to the optical pillar structures by the optical clear adhesive layer.

16. The projection screen as recited in claim 15, further comprising a plurality of diffusion micro-structures, wherein the diffusion micro-structures are disposed at the first surface of the transparent substrate, the second surface of the transparent substrate, surfaces of the optical pillar structures, the reflection surfaces, inside of the optical clear adhesive layer or a surface of the optical clear adhesive layer.

17. The projection screen as recited in claim 1, wherein each of the optical pillar structures further comprises a plurality of diffusion micro-structures, and the diffusion micro-structures are disposed inside of each of the optical pillar structures.

18. The projection screen as recited in claim 1, wherein the light-absorption layer covers the transmissive surface of each of the Fresnel structures.

* * * * *